(12) United States Patent
Lim et al.

(10) Patent No.: US 11,279,335 B2
(45) Date of Patent: Mar. 22, 2022

(54) DEVICE FOR DETECTING WHEEL SPEED

(71) Applicant: ILJIN GLOBAL CO.,LTD, Seoul (KR)

(72) Inventors: Jong Keun Lim, Seoul (KR); Sang Jun Lee, Seoul (KR); Young Tae Kim, Seoul (KR); Jae Wan Lim, Seoul (KR); Joung Woo Hur, Seoul (KR)

(73) Assignee: ILJIN GLOBAL CO., LTD, Seoul (KR)

( * ) Notice: Subject to any disclaimer, the term of this patent is extended or adjusted under 35 U.S.C. 154(b) by 182 days.

(21) Appl. No.: 16/580,023

(22) Filed: Sep. 24, 2019

(65) Prior Publication Data
US 2020/0023824 A1 Jan. 23, 2020

Related U.S. Application Data

(63) Continuation of application No. PCT/KR2017/015075, filed on Dec. 20, 2017.

(30) Foreign Application Priority Data

Mar. 24, 2017 (KR) .................. KR10-2017-0037734

(51) Int. Cl.
B60T 8/88 (2006.01)
B60T 8/171 (2006.01)
(Continued)

(52) U.S. Cl.
CPC .............. B60T 8/885 (2013.01); B60T 8/171 (2013.01); B60T 8/329 (2013.01); G01D 5/14 (2013.01); G01P 1/026 (2013.01); G01P 3/446 (2013.01)

(58) Field of Classification Search
CPC .......... B60T 8/171; B60T 8/329; B60T 8/885; G01P 1/026; G01P 3/446; G01P 3/443; G01P 3/484; G01D 5/14
(Continued)

(56) References Cited

U.S. PATENT DOCUMENTS 3,473,120 A * 10/1969 Ruof ....................... B60T 8/329
324/162
5,550,467 A * 8/1996 Goossens .............. F16C 33/723
324/173
(Continued)

FOREIGN PATENT DOCUMENTS

JP 2006162404 A 6/2006
JP 2008122268 A 5/2008
(Continued)

OTHER PUBLICATIONS

International Search Report for PCT/KR2017/075075 dated May 31, 2018.

Primary Examiner — Robert A. Siconolfi
Assistant Examiner — San M Aung
(74) Attorney, Agent, or Firm — Dinsmore & Shohl LLP; Yongsok Choi, Esq.

(57) ABSTRACT

A wheel speed detection device according to one aspect of the present disclosure is installable on a wheel bearing which comprises an outer ring and an inner ring coupled to a rotating shaft and relatively rotated relative to the outer ring about the rotating shaft. The wheel speed detection device comprises a first target concentrically coupled to the rotating shaft, a second target disposed along an outer circumference of the inner ring, a cap coupled to the outer ring to cover the first target and the second target, a first sensor disposed in the cap and configured to detect a variation in magnetic field of the first target due to a rotation of the rotating shaft, and a second sensor disposed in the cap
(Continued)

and configured to detect a variation in magnetic pole of the second target due to a rotation of the inner ring.

16 Claims, 10 Drawing Sheets

(51) Int. Cl.
    *B60T 8/32*     (2006.01)
    *G01D 5/14*     (2006.01)
    *G01P 1/02*     (2006.01)
    *G01P 3/44*     (2006.01)

(58) Field of Classification Search
    USPC .................................................. 303/122.08
    See application file for complete search history.

(56) References Cited

U.S. PATENT DOCUMENTS

| | | | | |
|---|---|---|---|---|
| 5,663,640 A | * | 9/1997 | Sakamoto | B60T 8/171 324/173 |
| 6,127,819 A | * | 10/2000 | Ouchi | G01P 1/02 324/173 |
| 2006/0002644 A1 | * | 1/2006 | Mitsue | B23B 5/02 384/448 |
| 2007/0169868 A1 | * | 7/2007 | Fujiwara | B60B 27/0094 152/415 |
| 2010/0182762 A1 | * | 7/2010 | Itomi | G01D 5/2449 361/807 |
| 2012/0177312 A1 | * | 7/2012 | Aritake | F16C 33/783 384/446 |
| 2013/0249273 A1 | * | 9/2013 | Norimatsu | F16C 33/723 301/109 |

FOREIGN PATENT DOCUMENTS

| | | |
|---|---|---|
| KR | 100842392 B1 | 7/2008 |
| KR | 100968799 B1 | 7/2010 |
| KR | 101134905 B1 | 4/2012 |

\* cited by examiner

DEVICE FOR DETECTING WHEEL SPEED

CROSS-REFERENCE TO RELATED APPLICATION

This application is a continuation of International Patent Application No. PCT/KR2017/015075 filed on Dec. 20, 2017 which claims priority to Korean Patent Application No. 10-2017-0037734 filed on Mar. 24, 2017, the entire contents of which are herein incorporated by reference.

BACKGROUND

Technical Field

The present disclosure relates to a wheel speed detection device.

Background Art

In various application systems, such as an anti-lock brake system (ABS) and the like, applied to conventional vehicles, a rotation speed and a rotation direction of a wheel are measured. The ABS is a system for preventing a lock-up phenomenon that a wheel is completely locked by a brake during braking operation and as a result the vehicle body is overturned or skidded. For this purpose, a rotation speed and a rotation direction of the wheel are measured by a wheel speed sensor. The wheel speed sensor may comprise a target which is provided in the form of a ring on an inner ring of a bearing coupled to a rotating shaft of the wheel. The target is comprised of a number of magnetic pole pairs. In the wheel speed sensor having the above structure, the rotation speed and direction of the wheel are measured on the basis of the rotation speed and direction of the target, and the measurement accuracy is determined by the number of magnetic pole pairs.

SUMMARY

In order to implement functions of a vehicle, such as autonomous driving, automatic parking, and the like, accurate control of the wheel is required. To this end, more accurate measurement with respect to the rotation speed and direction of the wheel is required. However, in the conventional wheel speed sensor, there is a limitation on increase of the number of magnetic pole pairs.

The present disclosure is directed to providing a wheel speed detection device, which allows accurate control of a wheel, for resolving the technical problems of the aforementioned prior art.

A wheel speed detection device according to one aspect of the present disclosure is a wheel speed detection device installable on a wheel bearing which comprises an outer ring and an inner ring coupled to a rotating shaft and relatively rotated relative to the outer ring about the rotating shaft. The wheel speed detection device comprises a first target concentrically coupled to the rotating shaft, a second target disposed along an outer circumference of the inner ring, a cap coupled to the outer ring to cover the first target and the second target, a first sensor disposed in the cap and configured to detect a variation in magnetic field of the first target due to a rotation of the rotating shaft, and a second sensor disposed in the cap and configured to detect a variation in magnetic pole of the second target due to a rotation of the inner ring.

In one embodiment, the first sensor may generate information on a rotation angle of the rotating shaft on the basis of the variation in magnetic field of the first target.

In one embodiment, the first sensor may comprise a detector which is concentrically disposed with respect to the rotating shaft.

In one embodiment, the first sensor may comprise a cylindrical housing which is disposed in the cap to be concentric with the rotating shaft.

In one embodiment, the wheel speed detection device may further comprise a mount configured to fix the first sensor to the cap.

In one embodiment, the first target may comprise a pin coupled to the rotating shaft, and a cylindrical head disposed at an end portion of the pin and having a pair of different magnetic poles.

In one embodiment, the head may include magnetic material and plastic material.

In one embodiment, the cap may include nonmagnetic material.

In one embodiment, the cap may be water-tightly coupled to the outer ring.

In one embodiment, the cap may comprise a sensor accommodation portion which is recessed toward the first target and accommodates the first sensor.

In one embodiment, the cap may comprise a first cap coupled to an inner circumferential surface of the outer ring, and a second cap coupled to an outer circumferential surface of the outer ring.

In one embodiment, the first sensor may comprise a rod-shaped housing disposed in the cap to be perpendicular to the rotating shaft.

A wheel speed detection device according to another aspect of the present disclosure is a wheel speed detection device installable on a wheel bearing which comprises an outer ring and an inner ring coupled to a rotating shaft and relatively rotated relative to the outer ring about the rotating shaft. The wheel speed detection device comprises a first target concentrically coupled to the rotating shaft, a second target disposed along an outer circumference of the inner ring, a cap coupled to the outer ring to cover the first target and the second target, a first detector configured to detect a variation in magnetic field of the first target due a rotation of the rotating shaft, a second detector configured to detect a variation in magnetic pole of the second target due to a rotation of the inner ring, and a sensor disposed in the cap.

In one embodiment, the sensor may comprise a rod-shaped housing on which the first detector and the second detector are mounted and which is disposed to be perpendicular to the rotating shaft.

In one embodiment, the first target may comprise a pin coupled to the rotating shaft, and a cylindrical head disposed at an end portion of the pin and having a pair of different magnetic poles.

In one embodiment, the head may include magnetic material and plastic material.

In one embodiment, the cap may include nonmagnetic material.

In one embodiment, the cap may be water-tightly coupled to the outer ring.

The wheel speed detection device according to various embodiments of the present disclosure may allow accurate control of a wheel by providing rotation information with a plurality of different resolutions.

Further, the wheel speed detection device according to various embodiments of the present disclosure is configured such that a first target is concentrically coupled to a rotating shaft, a second target is coupled to an inner ring to be concentric with the rotating shaft, and a sensor is disposed on a cap, which is coupled to an outer ring of a bearing so as to cover the first target and the second target, to detect magnetic fields generated from the first target and the second target due to a rotation of the rotating shaft. Consequently, there is no need to install a coupling member for directly connecting the sensor to the rotating shaft, and thus assembly of the wheel speed detection device can be simplified and a manufacturing cost of the wheel speed detection device can be reduced. Further, since the cap is coupled to the outer ring so as to cover the first target and the second target, it is possible to prevent foreign materials such as dust or water from being introduced into a wheel bearing.

Further, in the wheel speed detection device according to various embodiments of the present disclosure, the sensor comprises a first detector for detecting a variation in magnetic field of the first target and a second detector for detecting a variation in magnetic pole of the second target which is disposed outward in a radial direction of the first target, and thus a single sensor can measure the variations in magnetic field of the first target and in magnetic pole of the second target. Consequently, in addition to the wheel speed detection device, a separate sensor for detecting the second target is not required such that a space in which a separate sensor is mounted can be saved.

DETAILED DESCRIPTION

Figure 1:
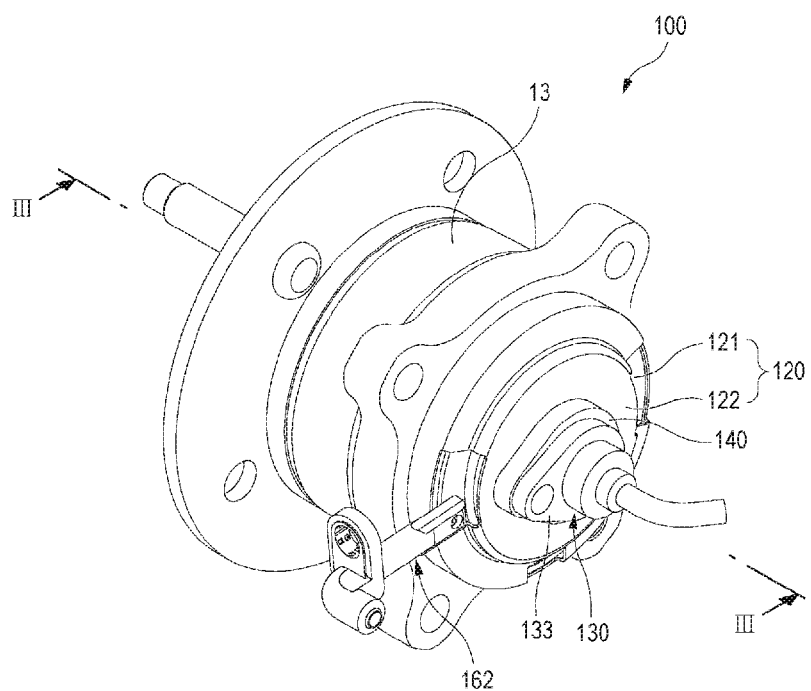
FIG. 1 is a perspective view illustrating a wheel speed detection device according to one embodiment of the present disclosure.

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," "taking," and the like used herein should be construed as open-ended terms encompassing the possibility of including other embodiments.

The singular form described herein may include the plural form unless the context clearly dictates otherwise, and this is equally applied to the singular form set forth in the claims.

Terms a "first," a "second," and the like are used to distinguish a plurality of components, and the order or importance of corresponding components is not limited by these terms.

The term a "part" used herein refers to software or a hardware component such as a field-programmable gate array (FPGA), an application specific integrated circuit (ASIC), or the like. However, the "part" is not limited to hardware and software. The "part" may be configured to reside on an addressable storage medium or may be configured to playback one or more processors. For example, the "part" includes components, such as software components, object oriented software components, class components, and task components, processes, functions, procedures, subroutines, segments of a program code, drivers, firmware, microcode, a circuit, data, a databases, data structures, tables, arrays, and variables. A function provided in the components and the "part" may be combined into a smaller number of components and "parts" or may be further divided into additional components and "parts."

In the present disclosure, the expression "~on the basis of" is used to describe one or more factors affecting an action or an operation of a decision or a determination, which are described in a phrase or sentence in which the expression is contained, and this expression does not exclude additional factors affecting the action or the operation of the decision or the determination.

Throughout the present disclosure, when a component is referred to as being "connected" or "coupled" to another component, the component can be directly connected or coupled to another component, or can be directly connected or coupled to another component by intervening yet another component therebetween.

Dimensions and numerical values described in the present disclosure are not limited only to the dimensions and numerical values described herein. Unless otherwise specified, these dimensions and numerical values will be understood to mean the values described herein and the equivalent ranges including the described values. For example, a dimension of "0.01 mm" described herein can be understood to include "about 0.01 mm."

Hereinafter, exemplary embodiments of the present disclosure will be described with reference to the accompanying drawings. In the accompanying drawings, the same reference numerals are assigned to the same or corresponding components. Further, in the following description of the embodiments, a duplicate description of the same or corresponding components may be omitted. However, even though a description of a component is omitted, such a component is not intended to be excluded in any embodiment.

Figure 2:
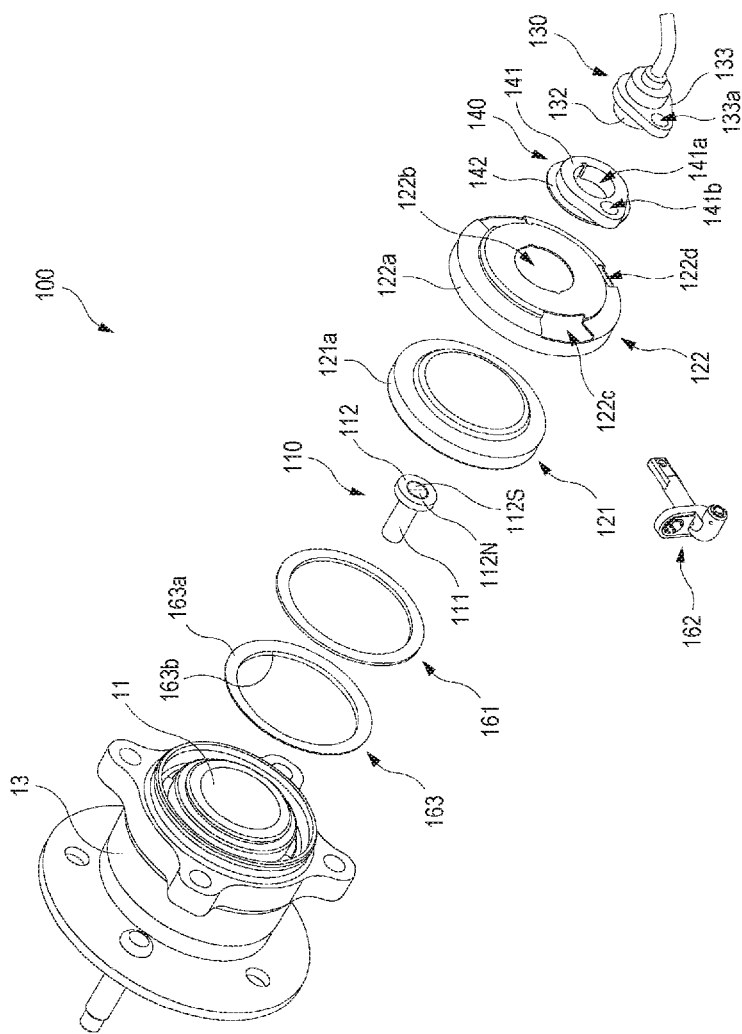
FIG. 2 is an exploded perspective view illustrating the wheel speed detection device shown in FIG. 1.
Figure 3:
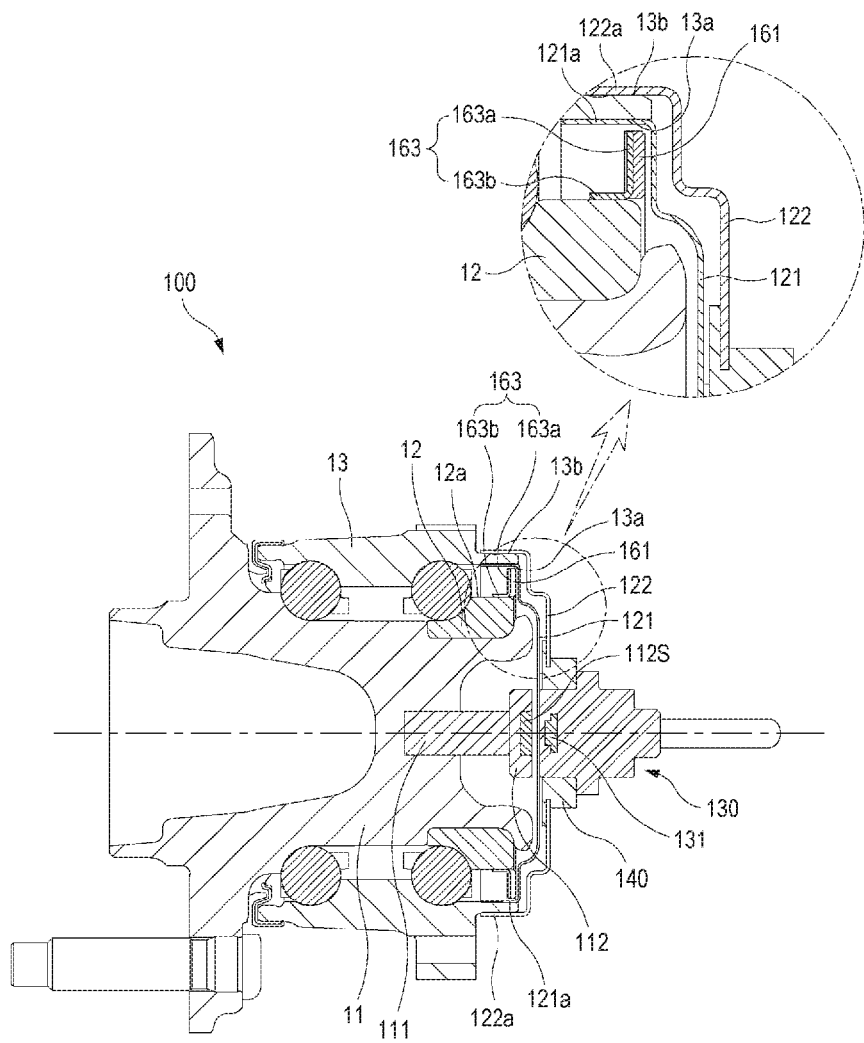
FIG. 3 is a cross-sectional view taken along line III-III shown in FIG. 1.

FIG. 1 is a perspective view illustrating a wheel speed detection device according to one embodiment of the present disclosure. FIG. 2 is an exploded perspective view illustrating the wheel speed detection device shown in FIG. 1. FIG. 3 is a cross-sectional view taken along line III-III shown in FIG. 1.

Referring to FIGS. 1 to 3, a wheel speed detection device 100 according to one embodiment of the present disclosure comprises a first target 110, a second target 161, a cap 120, a first sensor 130, and a second sensor 162. The wheel speed detection device 100 is mounted on a wheel bearing 10. The wheel bearing 10 comprises an outer ring 13 and an inner ring 12 which is coupled to a rotating shaft 11 and relatively rotates relative to the outer ring 13 about the rotating shaft 11.

The first target 110 comprises a pair of different magnetic poles and is concentrically coupled to the rotating shaft 11. In one embodiment, the first target 110 may comprise a pin 111 coupled to the rotating shaft 11 and a head 112 disposed at an end portion of the pin 111 and having a pair of different magnetic poles. In present embodiment, the feature "a pair of different magnetic poles" refers that different magnetic poles (e.g., an N pole and an S pole) form a pair. The pin 111 may be made of nonmagnetic material such that the pin 111 does not affect a magnetic field which is generated from the head 112. The pin 111 of the first target 110 is coupled to a center of the rotating shaft 11 to be concentric with the rotating shaft 11. For example, the pin 111 may be coupled to the center of the rotating shaft 11 by a coupling method such as press-fitting, screwing, welding, or the like.

The head 112 may have a cylindrical or disc shape. The head 112 comprises a semicircular N pole 112N and a semicircular S pole 112S. The head 112 may include magnetic material and plastic material. When the head 112 is made of magnetic material and plastic material, the head 112 may be manufactured by mixing magnetic powder into molten plastic material to be molded into a cylindrical shape and then magnetizing the molded head 112. Alternatively, the head 112 may be manufactured by forming and magnetizing magnetic material in a cylindrical shape and then insert-molding plastic material using the magnetized magnetic material as an insert. Alternatively, the head 112 may be manufactured by forming and magnetizing magnetic material in a cylindrical shape and then press-fitting the magnetized magnetic material into a body made of plastic material.

The second target 161 has a ring shape, and different magnetic poles are alternately disposed in a circumferential direction of the second target 161. For example, an N pole and an S pole may be alternately disposed on the second target 161, and a plurality of magnetic pole pairs comprised of N poles and S poles may be disposed on the second target 161. The second target 161 is coupled to the inner ring 12 so as to be disposed outward in a radial direction of the first target 110. As shown in FIGS. 2 and 3, the second target 161 may be coupled to the inner ring 12 by a coupling member 163. The coupling member 163 may comprise a second target coupling portion 163a corresponding to the shape of the second target 161, and an inner ring coupling portion 163b extending vertically from the second target coupling portion 163a and coupled to an outer circumferential surface 12a of the inner ring 12. The second target 161 may be coupled to the inner ring 12 by press-fitting the inner ring coupling portion 163b to the outer circumferential surface 12a of the inner ring 12.

The cap 120 is coupled to the outer ring 13 to entirely cover the first target 110. In one embodiment, the cap 120 may include nonmagnetic material. Since the cap 120 is made of a nonmagnetic material, the cap 120 does not affect a magnetic field formed from the first target 110. Specifically, the cap 120 may be made of reinforced plastic or a nonmagnetic metal (e.g., stainless steel). When the cap 120 is made of a nonmagnetic metal, the cap 120 may be manufactured by pressing or punching a thin plate-shaped metal material.

In one embodiment, the cap 120 may comprise a first cap 121 coupled to an inner circumferential surface 13a of the outer ring 13 and a second cap 122 coupled to an outer circumferential surface 13b of the outer ring 13. The first cap 121 is coupled to the outer ring 13 to entirely cover the first target 110, the second target 161, and the inner ring 12. The first cap 121 comprises an inner circumferential surface coupling portion 121a extending in an axial direction of the rotating shaft 11 so as to be coupled to the inner circumferential surface 13a of the outer ring 13. The first cap 121 may be air-tightly or water-tightly coupled to the outer ring 13 by press-fitting the inner circumferential surface coupling portion 121a to the inner circumferential surface 13a of the outer ring 13.

The second cap 122 is coupled to the outer ring 13 to cover the first cap 121 and the outer ring 13. The second cap 122 comprises an outer circumferential surface coupling portion 122a extending in an axial direction of the rotating shaft 11 so as to be coupled to the outer circumferential surface 13b of the outer ring 13. The second cap 122 may be coupled to the outer ring 13 by caulking, swaging, forced press-fitting, or the like, in a state that the outer circumferential surface coupling portion 122a is disposed to surround the outer circumferential surface 13b of the outer ring 13. In one embodiment, the second cap 122 may comprise an opening 122b through which a housing 132 of the first sensor 130 passes, a through-hole 122c through which the second sensor 162 passes, and a drainage hole 122d through which introduced dust or fluid is discharged. The opening 122b is formed in a center of the second cap 122. The through-hole 122c is formed to be spaced a predetermined distance from the opening 122b outward in a radial direction. In a state in which the wheel speed detection device 100 is mounted on the vehicle, the through-hole 122c may formed to pass through a center of the opening 122b and to be parallel to the ground. For example, two through-holes 122c may be disposed to form 180 degrees about the opening 122b. In the state in which the wheel speed detection device 100 is mounted on the vehicle, the drainage hole 122d may be formed on a lowest side of the second cap 122 so as to pass through the center of the opening 122b and to be perpendicular to the ground.

The first sensor 130 is disposed in the cap 120 and detects a variation in magnetic field of the first target 110 due to a rotation of the rotating shaft 11. The first sensor 130 is configured to generate a signal regarding a rotation angle of the rotating shaft 11 on the basis of a variation in magnetic field of the first target 110. In one embodiment, the first sensor 130 may comprise a detector 131 which is concentrically disposed with respect to the rotating shaft 11. The detector 131 of the first sensor 130 is spaced a predetermined distance from the first target 110 in the axial direction of the rotating shaft 11 and disposed to face the first target 110. When the first target 110 makes one rotation together with the rotating shaft 11, the magnetic field generated from the first target 110 is varied with a period. The detector 131 of the first sensor 130 is configured to generate a signal in the form of a pulse according to such a period, and an electronic control unit (ECU) of the vehicle is configured to generate information on a rotation angle, a rotation speed, and a rotation direction of the rotating shaft 11 on the basis of the generated signal.

In order to detect the variation in magnetic field of the first target 110 due to the rotation of the rotating shaft 11, the detector 131 of the first sensor 130 may use at least one among a Hall effect, an anisotropic magneto resistance (AMR) effect, a giant magneto resistance (GMR) effect, and a tunnel magneto resistance (TMR) effect. The Hall effect is an effect that when a magnetic field is applied to an electrical conductor in which a current flows, a potential difference occurs in a direction perpendicular to directions of both of the current and the magnetic field. For example, the detector 131 of the first sensor 130 may measure an intensity value of the magnetic field induced in the electrical conductor by measuring a potential difference occurring due to the Hall effect. The MR effect is an effect that a resistance value of a magnetic material is varied based on intensity and/or a direction of a magnetic field applied to the magnetic material. The AMR effect is an effect that resistance of a ferromagnetic material is varied according to a magnetization characteristic formed due to a magnetic field applied to the ferromagnetic material and a direction of a current applied to the ferromagnetic material. The GMR effect is an effect that resistance of a magnetic material is varied according to a spin direction of electrons and a magnetization characteristic formed due to a magnetic field generated from the magnetic material including two ferromagnetic bodies and an electrical conductor disposed therebetween. The TMR effect is an effect that resistance of a magnetic material is varied according to a magnetization characteristic formed due to a magnetic field generated from the magnetic material including two ferromagnetic bodies and an insulator disposed therebetween. According to one embodiment, the detector 131 of the first sensor 130 measures a voltage which is varied according to a current applied to a magnetic material and measures a resistance value of the magnetic material, which is varied according to a generated magnetic field through an AMR, GMR, or TMR effect, such that an intensity value of the magnetic field generated from the magnetic material may be measured.

Alternatively, the detector 131 of the first sensor 130 may be configured to detect a variation in magnetic field to generate a signal, and directly generate information on a rotation angle, a rotation speed, and a rotation direction of the rotating shaft 11 on the basis of such a signal. For example, the first sensor 130 may further comprise a processor which generates information on the rotation angle, the rotation direction, and the rotation speed of the rotating shaft 11 on the basis of the signal received from the detector 131. Further, the detector 131 and the processor may be configured as an integrated circuit (IC) chip. Accordingly, the first sensor 130 may be miniaturized.

A gap between the detector 131 and the first target 110 may range from about 0.1 mm to about 4 mm. It is difficult to manufacture the first target 110 and the first sensor 130 so as to achieve the gap between the detector 131 and the first target 110 to be less than 0.1 mm. Further, when the gap between the detector 131 and the first target 110 exceeds 4 mm, intensity of the magnetic field generated from the first target 110 and then arrived at the detector 131 is weakened and thus accuracy of the detector 131 detecting the first target 110 may be degraded.

In one embodiment, the first sensor 130 may comprise the cylindrical housing 132 disposed in the cap 120 so as to be concentric with the rotating shaft 11. Since the rotating shaft 11, the first target 110 and the cap 120 have a circular shape, the first sensor 130 may be easily disposed to be concentric with the rotating shaft 11 by aligning a center of the cylindrical housing 132 with centers of the rotating shaft 11, the first target 110 and the cap 120.

In one embodiment, the wheel speed detection device 100 may further comprise a mount 140 for fixing the first sensor 130 to the second cap 122. The mount 140 comprises a body 141 formed on an axially outer side of the second cap 122 (i.e., a side at which the first sensor 130 is disposed) and a button portion 142 formed on an axially inner side of the second cap 122 (i.e., a side at which the first cap 121 is disposed). The mount 140 may be manufactured by injection-molding or over-molding plastic material so as to form the body 141 and the button portion 142 in the state that the second cap 122 is fixed to a mold. The body 141 comprises an opening 141a through which the housing 132 of the first sensor 130 passes and one engagement portion 141b for engaging the first sensor 130. The engagement portion 141b may be comprised of a screw hole or a nut. The button portion 142 may be formed to be larger than an outer diameter of the body 141 so as to prevent the mount 140 from being separated from the second cap 122.

As shown in FIGS. 1 and 3, the first sensor 130 may comprise a flange 133 which is coupled with the engagement portion 141b of the mount 140. The flange 133 is formed to protrude outward from an outer circumferential surface of the housing 132. The flange 133 has a screw hole 133a with which an engagement means such as a bolt or a screw is engaged or through which the engagement means passes. In order to prevent the first sensor 130 from being rotated relative to the mount 140, a recess or a protrusion may be formed on an inner circumferential surface of the opening 141a of the body 141, and a protrusion or a recess may be formed on an outer circumferential surface of the housing 132 of the first sensor 130 so as to be complementarily engaged with the recess or the protrusion formed on the inner circumferential surface of the opening 141a of the body 141.

Figure 4:
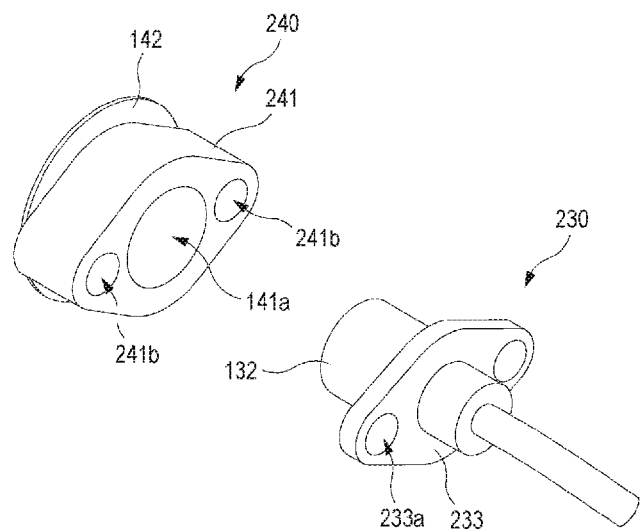
FIG. 4 is an exploded perspective view illustrating another embodiment of a first sensor and a mount shown in FIG. 1.

FIG. 4 is an exploded perspective view illustrating another embodiment of a first sensor and a mount shown in FIG. 1.

As shown in FIG. 4, a mount 240 may comprise a body 241 and the button portion 142. The body 241 comprises the opening 141a through which the housing 132 of a first sensor 230 passes and two engagement portions 241b for engaging the first sensor 230. The two engagement portions 241b may be disposed to form 180 degrees based on a center of the opening 141a. The first sensor 230 may comprise a flange 233 which is coupled with the engagement portion 241b of the mount 240. The flange 233 has two screw holes 233a with which an engagement means such as a bolt or a screw is engaged or through which the engagement means passes. Consequently, the first sensor 230 may be prevented from being rotated relative to the mount 240.

The second sensor 162 is disposed on the first cap 121 by passing through the through-hole 122c of the second cap 122 and detects a variation in magnetic pole (or a variation in magnetic field) of the second target 161 due to a rotation of the inner ring 12. The second sensor 162 is spaced a predetermined distance from the second target 161 in the axial direction of the rotating shaft 11 and disposed to face the second target 161. While the second target 161 makes one rotation together with the rotating shaft 11, magnetic poles formed in the second target 161 are varied as a plurality of periods. The second sensor 162 detects such periods and generates a signal in the form of a pulse so that the ECU of the vehicle generates information on a rotation speed of the rotating shaft 11.

In one embodiment, the second sensor 162 may be configured to detect a magnetic field generated from the second target 161 to output an intensity value of the magnetic field.

The second sensor 162 may operate in a manner similar to that of the existing wheel speed sensor. For example, when the second sensor 162 is close to an N pole of the second target 161, the second sensor 162 may output the intensity value of the magnetic field as a (+) electrical signal. Further, when the second sensor 162 is close to an S pole of the second target 161, the second sensor 162 may output the intensity value of the magnetic field as a (−) electrical signal. Thus, when the second target 161 having a pair of N-S poles is rotated one turn, an intensity value of the magnetic field is output as zero at a boundary between the N pole and the S pole and intensity values of the magnetic field are output as maximum (+) and (−) electrical signals at center points of the N pole and the S pole. Accordingly, the intensity value of the magnetic field is output as a sinusoidal electrical signal of one period. Under such an operating principle, a resolution of the second sensor 162 may be determined on the basis of the number of poles of a magnet of the second target 161. Assuming that the second target 161 has five pairs of N poles and S poles, sinusoidal electrical signals of five periods in total may be output while the second target 161 is rotated one turn, and thus it is possible to measure a rotation speed of a wheel with a resolution of 72 degrees (=360 degrees/5) by the second sensor 162. Since the second target 161 mounted on the inner ring 12 generally has magnetic pole pairs ranging from 43 to 80 pairs in a wheel rotation speed measurement system for a vehicle, the second sensor 162 can measure a rotation speed of a wheel for a vehicle to output an electrical signal with a resolution ranging from about 3 to 8 degrees.

In one embodiment, the ECU of the vehicle may be configured to generate information on a rotation angle, a rotation speed, and a rotation direction of the rotating shaft 11 on the basis of a signal from the first sensor 130 and generate information on the rotation speed of the rotating shaft 11 on the basis of a signal from the second sensor 162, when a vehicle is driving at a low speed. Meanwhile, the ECU of the vehicle may be configured to generate information on the rotation speed of the rotating shaft 11 on the basis of the signal from the second sensor 162, when the vehicle is driving at a high speed. Thus, when the vehicle is driving at a low speed, the information on the rotation angle, the rotation speed, and the rotation direction of the rotating shaft 11, which is generated on the basis of the signal from the first sensor 130, may be used for accurate control of the wheel for autonomous driving, automatic parking, and the like. Simultaneously, the information on the rotation speed of the rotating shaft 11, which is generated on the basis of the signal from the second sensor 162, may be used for speed control of the wheel for ABS. When the vehicle is driving at a high speed, without the information on the rotation angle, the rotation speed, and the rotation direction of the rotating shaft 11 on the basis of the signal from the first sensor 130, only the rotation speed of the rotating shaft 11 may be measured on the basis of the signal from the second sensor 162 and the measured rotation speed may be used for the speed control of the wheel for ABS. This allows to save a time required to generate accurate rotation information (i.e., the rotation angle) on the basis of the signal from the first sensor 130 and to reduce a load on the ECU. For example, in the present disclosure, it may be assumed that a low speed of the vehicle is less than about 60 Km/h and a high speed thereof is equal to or greater than 60 Km/h. A criterion for these low and high speeds may be set variously according to requirements of the vehicle.

Figure 5:
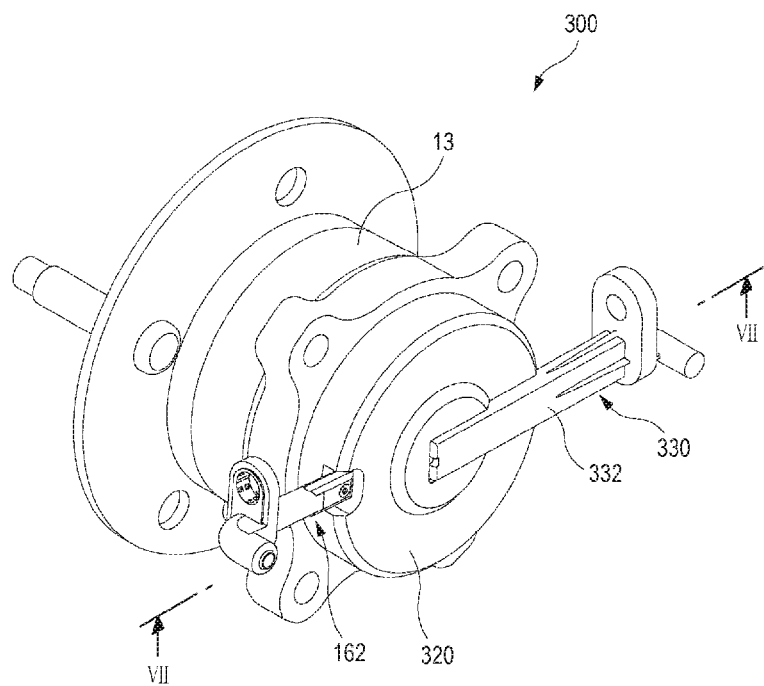
FIG. 5 is a perspective view illustrating a wheel speed detection device according to another embodiment of the present disclosure.
Figure 6:
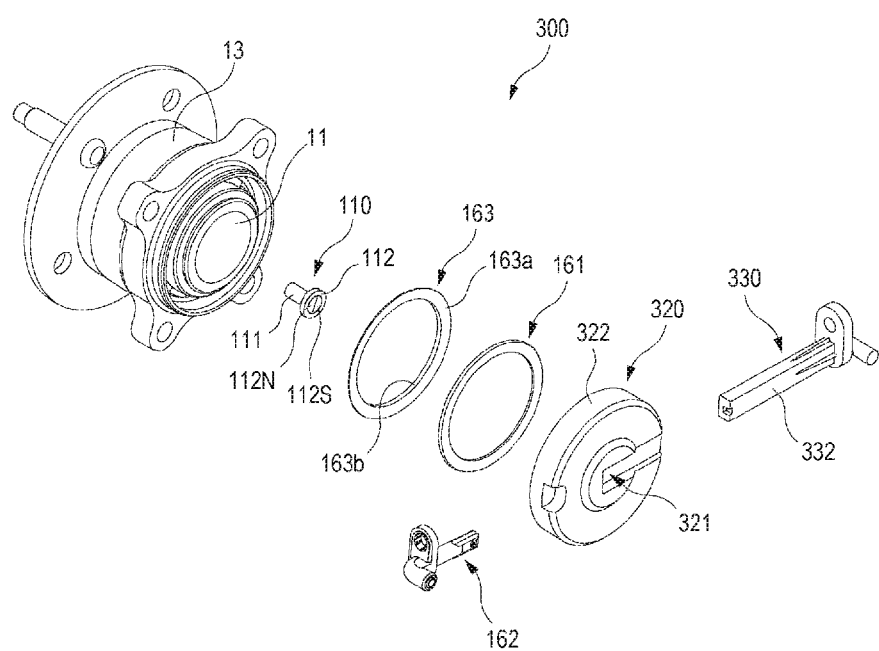
FIG. 6 is an exploded perspective view illustrating the wheel speed detection device shown in FIG. 5.
Figure 7:
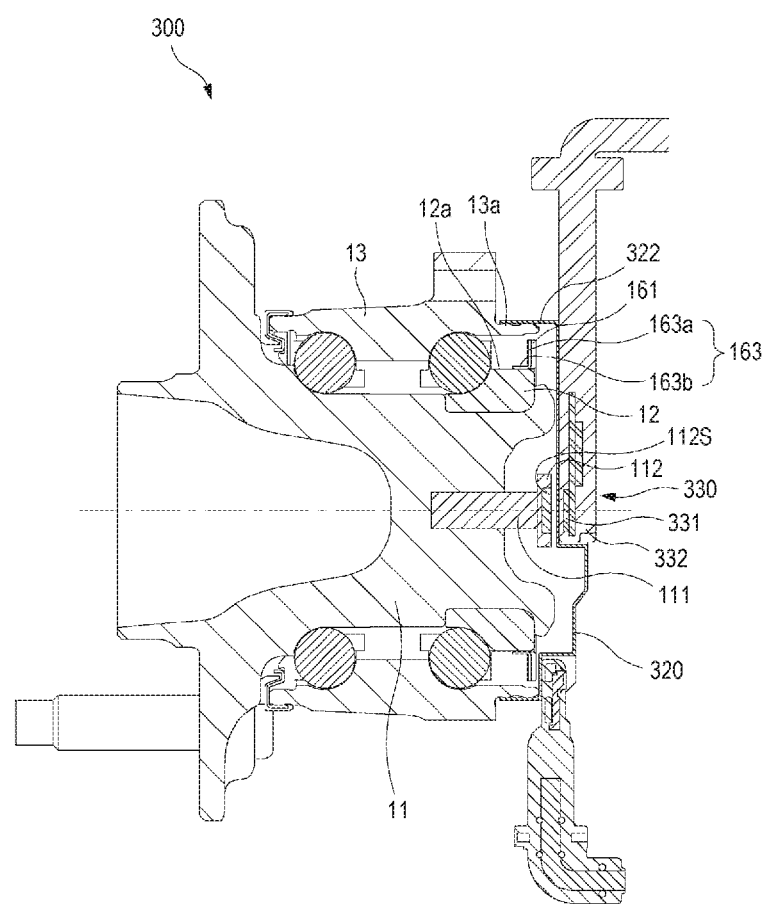
FIG. 7 is a cross-sectional view taken along line VII-VII shown in FIG. 5.

FIG. 5 is a perspective view illustrating a wheel speed detection device according to another embodiment of the present disclosure. FIG. 6 is an exploded perspective view illustrating the wheel speed detection device shown in FIG. 5. FIG. 7 is a cross-sectional view taken along line VII-VII shown in FIG. 5.

Referring to FIGS. 5 to 7, a wheel speed detection device 300 according to another embodiment of the present disclosure comprises a first target 110, a cap 320, and a first sensor 330. In the description of the present embodiment, the same reference numerals are assigned to components which are the same as those of the wheel speed detection device 100 according to the embodiment shown in FIGS. 1 to 4, and detailed descriptions of the components will be omitted. Further, various modified embodiments of the wheel speed detection device 100 according to the embodiment shown in FIGS. 1 to 4 may be variously combined and applied to the wheel speed detection device 300 according to the embodiment shown in FIGS. 5 to 7.

As shown in FIGS. 5 to 7, the first sensor 330 comprises a detector 331 and a rod-shaped housing 332 disposed to be perpendicular to a rotating shaft 11. One end of the housing 332 of the first sensor 330 may be coupled to a portion of a vehicle body, such as a knuckle, and the other end thereof may be disposed adjacent to a center of the rotating shaft 11. The detector 331 according to the present embodiment may be disposed adjacent to the other end of the housing 332 so as to be concentrically disposed with respect to the rotating shaft 11.

In one embodiment, the cap 320 may comprise a sensor accommodation portion 321 which is recessed toward the first target 110 and accommodates the first sensor 330. In the present embodiment, the sensor accommodation portion 321 may be linearly formed radially outward from near a center of the cap 320. Specifically, one end of the sensor accommodation portion 321 is open at a radially outer end of the cap 320 and the other end thereof is closed near the center of the cap 320. The sensor accommodation portion 321 serves to accurately locate the first sensor 330 with respect to the first target 110 and prevent the first sensor 330 from being moved relative to the first target 110 when a vehicle is driving. For example, since the other end of the sensor accommodation portion 321 is fitted to or engaged with one end of the housing 332, the first sensor 330 may be effectively prevented from being moved in a length direction. Further, since the sensor accommodation portion 321 has a straight-line shape, the first sensor 330 may be effectively prevented from being moved in a direction perpendicular to the length direction.

In one embodiment, the cap 320 comprises an outer circumferential surface coupling portion 322 extending in an axial direction of the rotating shaft 11 so as to be coupled to an outer circumferential surface 13b of an outer ring 13. The cap 320 may be coupled to the outer ring 13 by caulking, swaging, forced press-fitting, or the like, in a state that the outer circumferential surface coupling portion 322 is disposed to surround the outer circumferential surface 13b of the outer ring 13.

Figure 8:
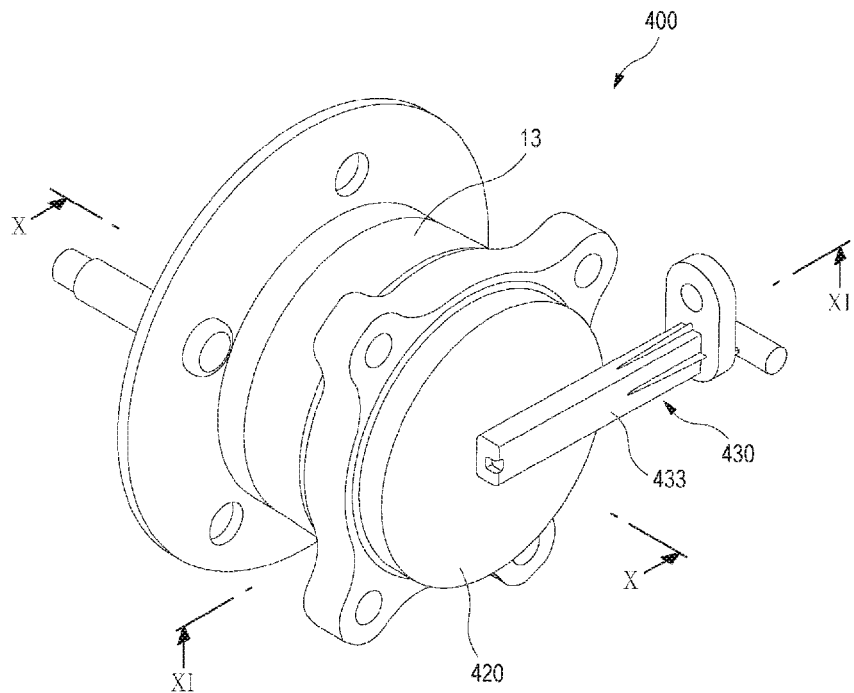
FIG. 8 is a perspective view illustrating a wheel speed detection device according to still another embodiment of the present disclosure.
Figure 9:
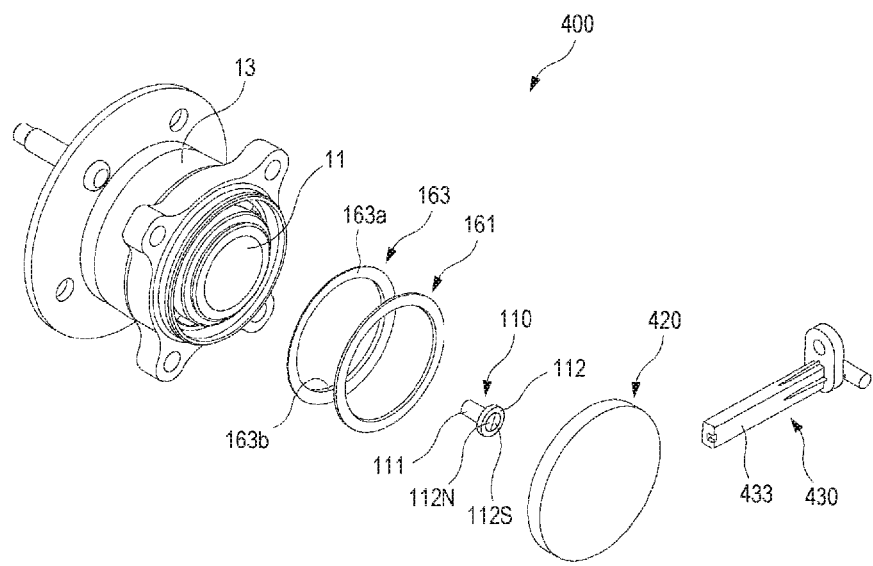
FIG. 9 is an exploded perspective view illustrating the wheel speed detection device shown in FIG. 8.
Figure 10:
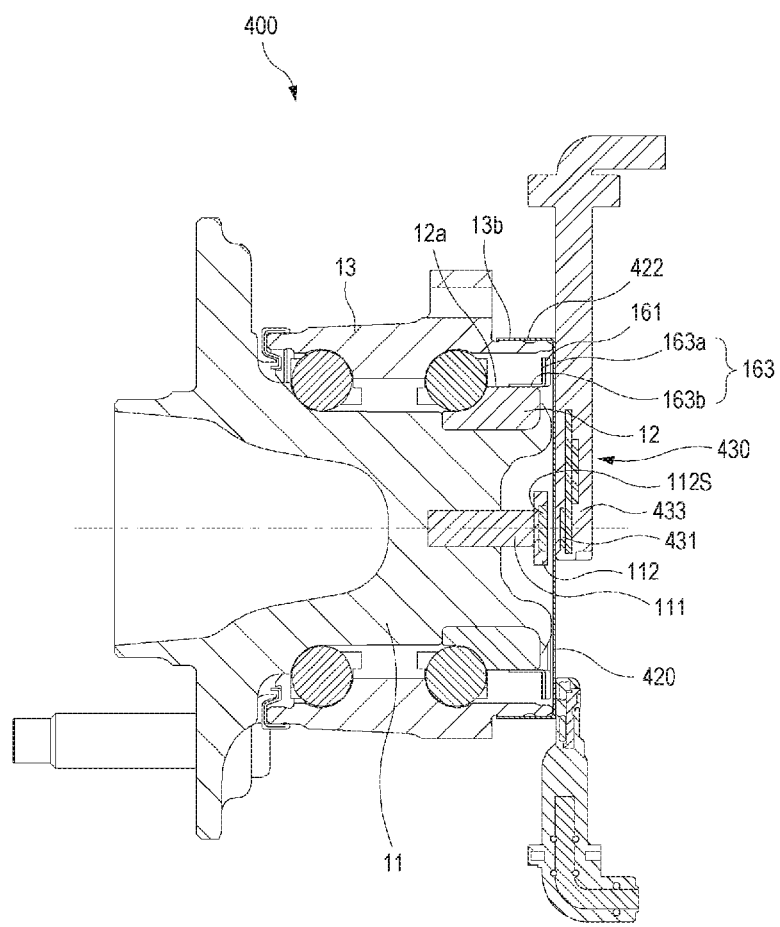
FIG. 10 is a cross-sectional view taken along line X-X shown in FIG. 8.
Figure 11:
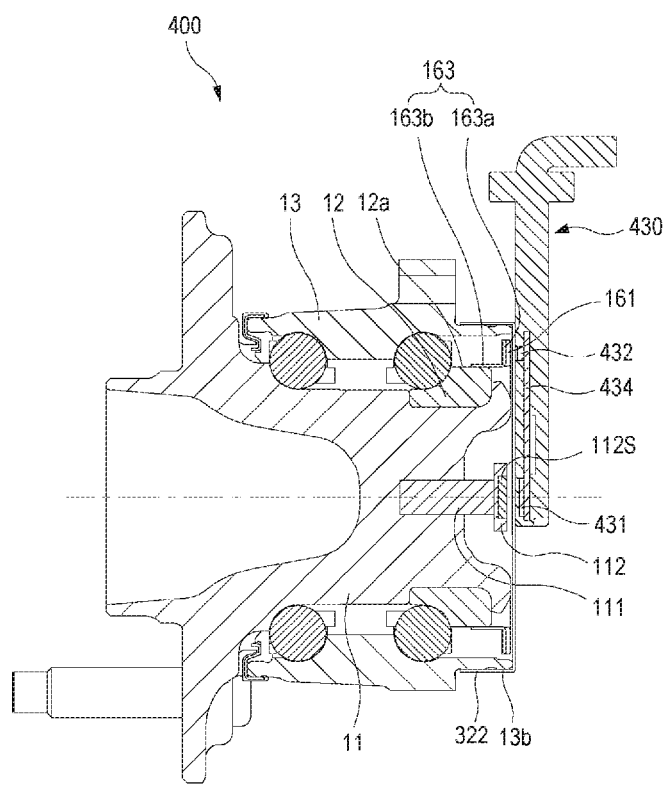
FIG. 11 is a cross-sectional view taken along line XI-XI shown in FIG. 8.

FIG. 8 is a perspective view illustrating a wheel speed detection device according to still another embodiment of the present disclosure. FIG. 9 is an exploded perspective view of the wheel speed detection device shown in FIG. 8. FIG. 10 is a cross-sectional view taken along line X-X shown in FIG. 8. FIG. 11 is a cross-sectional view taken along line XI-XI shown in FIG. 8.

Referring to FIGS. 8 to 11, a wheel speed detection device 400 according to still another embodiment of the present disclosure comprises a first target 110, a second target 161, a cap 420, and a sensor 430. In the description of the present embodiment, the same reference numerals are assigned to components which are the same as those of the wheel speed detection devices 100 and 300 according to the embodiments shown in FIGS. 1 to 7, and detailed descriptions of the components will be omitted. Further, various modified embodiments of the wheel speed detection devices 100 and 300 according to the embodiments shown in FIGS. 1 to 7 may be variously combined and applied to the wheel speed detection device 400 according to the embodiment shown in FIGS. 8 to 11.

The cap 420 of the wheel speed detection device 400 according to the embodiment shown in FIGS. 8 to 11 may be configured the same as or similar to the cap 320 of the wheel speed detection devices 100 and 300 according to the embodiments shown in FIGS. 5 to 7. For example, although the cap 420 has been illustrated as not having a sensor accommodation portion which accommodates the sensor 430 in FIGS. 8 to 11, as similar to the cap 320 of the wheel speed detection device 300 according to the embodiment shown in FIGS. 5 to 7, the cap 420 may have a sensor accommodation portion.

The sensor 430 is disposed in the cap 420 and comprises a first detector 431 and a second detector 432. The first detector 431 detects a variation in magnetic field of the first target 110 due to a rotation of the rotating shaft 11, and the second detector 432 detects a variation in magnetic pole of the second target 161 due to a rotation of an inner ring 12. In the embodiment shown in FIGS. 8 to 11, the first detector 431 may correspond to the detectors 131 and 331 of the first sensors 130 and 330 in the wheel speed detection devices 100 and 300 according to the embodiments shown in FIGS. 1 to 7, and the second detector 432 may correspond to the second sensor 162 in the wheel speed detection devices 100 and 300 according to the embodiments shown in FIGS. 1 to 7.

In one embodiment, the sensor 430 may comprise a rod-shaped housing 433, which is disposed to be perpendicular to the rotating shaft 11 and the first detector 431 and the second detector 432 are mounted thereon, and a printed circuit board 434 of electrically connecting the first detector 431 to the second detector 432 in the housing 433. As shown in FIG. 11, the first detector 431 is spaced a predetermined distance from the first target 110 in an axial direction of the rotating shaft 11 and disposed to face the first target 110. The second detector 432 is disposed to be spaced outward apart from the first detector 431 in a radial direction, is spaced a predetermined distance from the second target 161 in the axial direction of the rotating shaft 11, and is disposed to face the second target 161. The first detector 431 and the second detector 432 may be disposed to be spaced a difference in radial length between the first target 110 and the second target 161. Since the first detector 431 and the second detector 432 are integrally formed in the housing 433 of the sensor 430, one sensor 430 can measure both of a variation in magnetic field of the first target 110 and a variation in magnetic pole of the second target 161. Consequently, in addition to the wheel speed detection device, a separate sensor for detecting the second target is not required such that a space in which a separate sensor is mounted can be saved.

In one embodiment, the sensor 430 may further comprise a controller configured to generate, when a vehicle is driving at a low speed, information on a rotation angle, a rotation speed, and a rotation direction of the rotating shaft 11 on the basis of a signal from the first detector 431 and information on the rotation speed of the rotating shaft 11 on the basis of a signal from the second detector 432 and generate, when the vehicle is driving at a high speed, information on the rotation speed of the rotating shaft 11 on the basis of the signal from the second detector 432. When the vehicle is driving at a low speed, the information on the rotation angle, the rotation speed, and the rotation direction of the rotating shaft 11, which is generated on the basis of the signal from the first detector 431, may be used for accurate control of the wheel for autonomous driving, automatic parking, and the like. Simultaneously, the information on the rotation speed of the rotating shaft 11, which is generated on the basis of the signal from the second detector 432, may be used for speed control of the wheel for ABS. When the vehicle is driving at a high speed, without the information on the rotation angle, the rotation speed, and the rotation direction of the rotating shaft 11 on the basis of the signal from the first detector 431, the rotation speed of the rotating shaft 11 may be measured on the basis of the signal from the second detector 432 and the measured rotation speed may be used for the speed control of the wheel for ABS. This allows to save a time required to generate accurate rotation information (i.e., the rotation angle) on the basis of the signal from the first detector 431 and to reduce a load on the controller.

Figure 12:
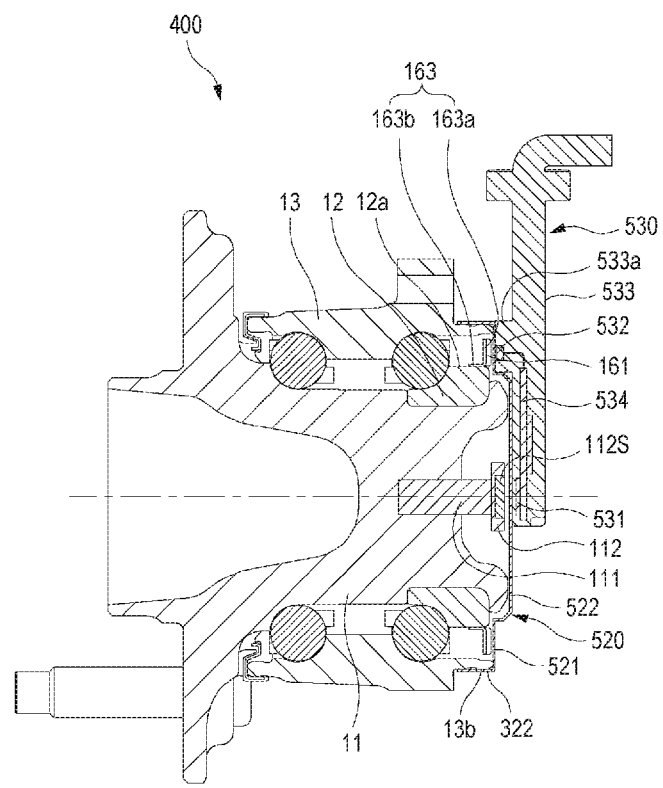
FIG. 12 is a cross-sectional view illustrating another embodiment of a cap and a sensor shown in FIG. 11.

FIG. 12 is a cross-sectional view illustrating another embodiment of a cap and a sensor shown in FIG. 11. As shown in FIG. 12, a sensor 530 is disposed in a cap 520 and comprises the first detector 431 and the second detector 432. In the present embodiment, the cap 520 may include an outer circumferential portion 521 corresponding to the second target 161, and a central portion 522 protruding from the outer circumferential portion 521 toward the sensor 530 and corresponding to the first target 110. In this case, the existing second target 161 may be applied without changing its position. In one embodiment, the sensor 530 may comprise a rod-shaped housing 533, which is disposed to be perpendicular to the rotating shaft 11 and on which the first detector 431 and the second detector 432 mounted, and a printed circuit board 534 of electrically connecting the first detector 431 in the housing 533. The housing 533 may comprise a protrusion 533a protruding toward the cap 520 at a position facing the second target 161 or the outer circumferential portion 521 of the cap 520. The first detector 431 may be mounted on the printed circuit board 534 so as to face the first target 110. The second detector 432 may be disposed on the protrusion 533a of the housing 533 so as to face the second target 161 and may be electrically connected to the printed circuit board 534 through a wire or a flexible printed circuit board.

Although the technical spirit of the present disclosure has been described by way of some embodiments and examples shown in the accompanying drawings, it should be noted that various substitutions, modification, and alterations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A wheel speed detection device installable on a wheel bearing which comprises an outer ring and an inner ring coupled to a rotating shaft and relatively rotated relative to the outer ring about the rotating shaft, the wheel speed detection device comprising:
- a first target concentrically coupled to the rotating shaft;
- a second target disposed along an outer circumference of the inner ring;
- a cap coupled to the outer ring to cover the first target and the second target;
- a first sensor configured to detect a variation in magnetic field of the first target due to a rotation of the rotating shaft and disposed in the cap; and
- a second sensor configured to detect a variation in magnetic pole of the second target due to a rotation of the inner ring and disposed in the cap, wherein the first target comprises:
  - a pin coupled to the rotating shaft; and
  - a cylindrical head disposed at an end portion of the pin and having a pair of different magnetic poles.

2. The wheel speed detection device of claim 1, wherein the first sensor generates information on a rotation angle of the rotating shaft on the basis of the variation in magnetic field of the first target.

3. The wheel speed detection device of claim 1, wherein the first sensor comprises a detector which is concentrically disposed with respect to the rotating shaft.

4. The wheel speed detection device of claim 1, wherein the first sensor comprises a cylindrical housing which is disposed in the cap to be concentric with the rotating shaft.

5. The wheel speed detection device of claim 4, further comprising a mount configured to fix the first sensor to the cap.

6. The wheel speed detection device of claim 1, wherein the head includes magnetic material and plastic material.

7. The wheel speed detection device of claim 1, wherein the cap includes nonmagnetic material.

8. The wheel speed detection device of claim 1, wherein the cap is water-tightly coupled to the outer ring.

9. The wheel speed detection device of claim 1, wherein the cap comprises a sensor accommodation portion which is recessed toward the first target and accommodates the first sensor.

10. The wheel speed detection device of claim 1, wherein the cap comprises a first cap coupled to an inner circumferential surface of the outer ring, and a second cap coupled to an outer circumferential surface of the outer ring.

11. The wheel speed detection device of claim 1, wherein the first sensor comprises a rod-shaped housing disposed in the cap to be perpendicular to the rotating shaft.

12. A wheel speed detection device installable on a wheel bearing which comprises an outer ring and an inner ring coupled to a rotating shaft and relatively rotated relative to the outer ring about the rotating shaft, the wheel speed detection device comprising:
- a first target concentrically coupled to the rotating shaft;
- a second target disposed along an outer circumference of the inner ring;
- a cap coupled to the outer ring to cover the first target and the second target;
- a first detector configured to detect a variation in magnetic field of the first target due a rotation of the rotating shaft;
- a second detector configured to detect a variation in magnetic pole of the second target due to a rotation of the inner ring; and
- a sensor disposed in the cap, wherein the first target includes:
  - a pin coupled to the rotating shaft; and
  - a cylindrical head disposed at an end portion of the pin and having a pair of different magnetic poles.

13. The wheel speed detection device of claim 12, wherein the sensor comprises a rod-shaped housing on which the first detector and the second detector are mounted and which is disposed to be perpendicular to the rotating shaft.

14. The wheel speed detection device of claim 12, wherein the head includes magnetic material and plastic material.

15. The wheel speed detection device of claim 12, wherein the cap includes nonmagnetic material.

16. The wheel speed detection device of claim 12, wherein the cap is water-tightly coupled to the outer ring.

* * * * *